UNITED STATES PATENT OFFICE.

AUGUSTUS A. HAYES, OF BOSTON, MASSACHUSETTS, ASSIGNOR TO WILLIAM T. GLIDDEN, OF SAME PLACE.

IMPROVEMENT IN RESTORING DEAMMONIATED GUANO.

Specification forming part of Letters Patent No. 41,663, dated February 16, 1864.

*To all whom it may concern:*

Be it known that I, AUGUSTUS A. HAYES, a resident of Boston, in the county of Suffolk and State of Massachusetts, have invented a new and useful improvement or process for restoring to or combining with washed or deammoniated guano the ammonia and nitrogenized compounds which it should possess in order that it may be used to advantage for fertilizing soils or sustaining growing crops thereof; and I do hereby declare the following to be a full and complete description of my said improvement in restoring to or combining with washed or deammoniated guano the ammonia and nitrogenized compounds which it should possess in order that it may fertilize soils and sustain growing crops.

The residue left after guano has been washed, in the latitudes where rain falls occasionally, is a mixture composed essentially of animal humus and bone phosphate of lime, magnesia, iron, and sulphate of lime. It is deficient in ammoniacal salts and nitrogenized compounds, and does not retain soluble phosphate of lime. By the following process one is enabled to give any desired degree of solubility to the bone phosphates and impregnate the mass of phosphates and lime salts with ammonia and nitrogenized products of animal fermentation without the loss of ammonia, which has hitherto been a great obstacle in the way of restoring to guano its fertilizing-power, and has increased the cost of the article produced. My process is founded on the fact that when to gaseous ammonia we present a gaseous acid the ammonia, whether free or in the form of volatile salts of ammonia, will be instantly combined with the gaseous acid and will form a solid tolerably-fixed salt which will remain. Now, I so adapt the means of rendering the phosphate of lime soluble as to have constantly present a volatile acid (besides carbonic acid, which has been relied upon) during the time of ammoniacal fermentation, such volatile acid serving to arrest any escape of ammonia and retain every particle of that alkali which may be formed. The saving thus effected is a constant result from the means employed, and no objection to the general application of the same means in respect to cost or nature of products appears in practice. When a solution of common salt or powder of common salt may be added to any form of phosphate of lime no decomposition will follow; but if sulphuric acid, either strong or diluted, be mixed with the wet mass, two results will follow. First, the lime of the phosphate will be seized upon by the sulphuric acid and phosphoric acid will be liberated; second, the soda formed from the common salt will be taken up by the sulphuric and phosphoric acids, so that some free phosphoric and free muriatic acids will be present. Muriatic or hydrochloric acid, being a gaseous acid, will constantly appear in the mixture, and when we add ammonia or an alkali in small quantity to the mixture the muriatic acid, first taking it up, will transfer it to the sulphuric or phosphoric acid, (which is free,) and then the muriatic acid will be set free to act again on a new portion, and so on so long as free sulphuric or phosphoric acid may remain. The ammonia to be taken up will arise from the putrefaction of animal remains going on in a state of mixture or apart from it.

Now, in carrying out my process it is very important that the animal remains or nitrogenized bodies should be in contact with the acid phosphate, and yet the latter should not be in a state to prevent putrefaction proceeding rapidly and regularly. Experience has shown that the phosphates containing free muriatic or hydrochloric acid do not impede putrefaction, but do arrest and hold fixed all ammoniacal compounds formed, so that the animal remains may be at once mixed with the mass of acid phosphates.

To enable a person skilled in the art to which my invention belongs to use my process, I now proceed to particularly describe it.

First. I determine how much bone phosphate of lime is present in a mass of guano-remains or other source of phosphate.

Second. If I wish to have the resulting compound contain phosphoric acid united to two proportions of lime instead of three, as usual, I take so much oil of vitriol as is equal to twenty-six pounds of anhydrous sulphuric acid, ($SO_3$.) If one proportion of phosphoric acid to one of lime base is to be left in the mass, I take so much oil of vitriol as will equal fifty-two pounds of anhydrous sulphuric acid ($SO_3$) When the quantity of animal matter used will afford four per cent. of ammonia, I use four pounds of common salt or chloride of sodium, or its equivalent, containing muriatic acid and put it with one hundred pounds of the phosphate, and to either, after it may have been mixed with the phosphate, I add four pounds of oil of vitriol previously diluted with twenty pounds of water or any animal secretion, glue, or ammonia-water. These weights may be increased in the same proportion for more or less ammonia to be formed.

Third. The moist mixture of guano or phosphate, being placed in a proper receptacle, is to be mixed with more water, if necessary, and next the apportioned quantity of oil of vitriol should be poured in and buried up in the mass. Much heat is usually generated, and offensive vapors are produced for which proper ventilation should be arranged, so that the mass can be stirred. When it begins to stiffen it must be removed to a heap. The first step of the process being taken in this or a similar way, the acid phosphate may be mixed readily with the animal matter—such as fish-remains, the residue of bone-boiling, or offal of any kind—in quantity sufficient to supply the required amount of ammonia, the whole being laid in heaps or bins to ferment and putrefy until from the indication of diminution of heat in the mass the putrefactive process may have ceased. The guano or other fertilizer thus treated may next be cut up, sifted, and packed for the market.

I do not claim making a concentrated manure by mixing in any manner with deammoniated guano animal matter previously treated with acid or its equivalent; nor do I claim the use of sulphate of lime in any respect with the animal matter, however it may be treated; nor do I claim the employment of an acid for separating an oil from a nitrogenous material, such having been accomplished long since by Appert and others.

I claim as my invention—

The application to deammoniated guano of sulphuric acid and common salt, or the equivalents thereof, and the combination of the mixture with putrefactive animal matter, or its equivalent, productive of ammonia, the whole being substantially as hereinbefore described.

AUG. A. HAYES.

Witnesses:
R. H. EDDY,
F. P. HALE, Jr.